Dec. 22, 1953   W. GRANDJOT   2,663,377
AUDIOMETRIC APPARATUS
Filed April 20, 1950

Inventor:
Walter Grandjot

Patented Dec. 22, 1953

2,663,377

UNITED STATES PATENT OFFICE 2,663,377

AUDIOMETRIC APPARATUS

Walter Grandjot, Bremen, Germany

Application April 20, 1950, Serial No. 157,020

1 Claim. (Cl. 181—.5)

This invention relates to an apparatus for measuring hearing-loss by air conduction and bone conduction. In order to have the same perception of loudness in the ear on air conduction as well as on bone conduction, the electric current to energize the receivers used in the audiometer has to be much higher at bone conduction than at air conduction. In other existing apparatus for measuring hearing-loss, a common movable volume control with an indicator for hearing-loss is used both for air and bone conduction and separate switching members are provided to increase the volume of tone when switching over from air to bone conduction. Furthermore the maximum volume which can be produced by such apparatus is high enough for testing by air conduction at all testing frequencies a person having a high degree of hearing-loss but it is not sufficient, however, for testing the same person by bone conduction at all testing frequencies. Therefore it is desirable to be able to operate the movable volume control up to said maximum volume when on air conduction as well as on bone conduction. In other apparatus the common movable volume control has the same end-position at bone conduction and air conduction. Therefore, if at this end-position, the maximum volume is delivered when air conduction is switched on, the same maximum value will be attained at a position of the volume control much nearer to the zero line of hearing-loss when bone conduction is switched on and wrong values of hearing-loss will be indicated if the volume control should be moved beyond that position.

The object of the invention is to provide an apparatus which will overcome this disadvantage. With this invention, I submit an apparatus of the type stated providing means for limiting the movement of the volume control at different points of the hearing-loss scale when air conduction and bone conduction is switched on respectively, the limit on bone conduction being nearer to the zero-line of the hearing-loss scale than the limit at air conduction.

An apparatus embodying the invention will now be described by way of example and with reference to the accompanying drawings, in which.

Figure 1:
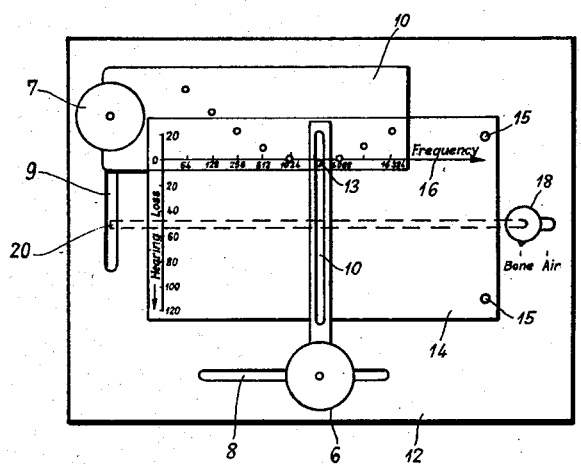
Fig. 1 is a front view of the apparatus.
Figure 2:
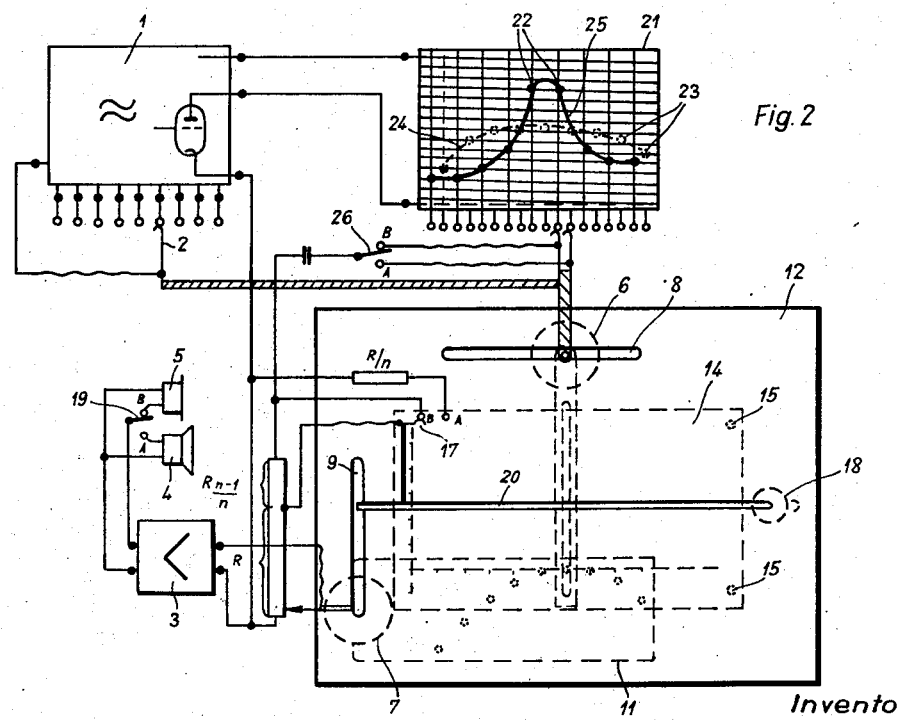
Fig. 2 is a rear view of the recording mechanism with circuit diagram of the whole apparatus.

The audiometer as shown in the drawings comprises a source of electrical oscillation of variable frequency, the electric current ranging in octaves from 64 to 16,384 cycles per second which may be selected by a switch 2. The amplitudes of the electric current may be selected by a movable volume control progressing in logarithmic steps. The electric current of variable frequency and amplitude is delivered to an air conduction receiver 4 or a bone conduction receiver 5. The knobs 6 and 7, provided for frequency and volume adjustment respectively, are movable on guides 8 and 9 which are arranged at right angles to one another. To each knob is fixed a transparent pointer 10 and 11 respectively sliding over the table 12 supporting the chart paper. The transposition point 13 of the two pointers 10 and 11 indicates the test value of the audiogram. A chart paper marked with a system of rectilineal coordinates can be placed between pointers 10, 11 and table 12.

A slot is provided in the frequency pointers 10 whereas pointer 11 for the volume indication has several holes spaced in accordance with the different frequencies ranging from 64 to 16,384 cycles per second. The recording device works in a semi-automatic manner. The slot in pointer 10 indicates the abscissa of the hearing diagram or audiogram. The knob 7 with its indicator 11 is movable in a vertical direction and regulates the test tone intensity over a wide range and thus indicates the co-ordinates of the audiogram. When the hearing minimum or threshold of hearing pertaining to a certain frequency has been found, this point can be marked with a pencil through the slot of pointer 10 and the corresponding hole of pointer 11. The pins 15, 15 on the table serve to locate the chart paper by means of two corresponding holes in the paper. After having connected the individual points marked on the chart paper which correspond to the nine frequencies, the audiogram is complete and shows the loss in hearing capacity. For persons of normal hearing capacity these points are found along the zero-line 16. For this reason the co-ordinate system has been chosen so that the hearing capacity of a patient hard-of-hearing is indicated opposite to that of a person with normal hearing capacity. For this purpose a test tone of an intensity just to be perceived by a person of normal hearing capacity is considered as zero value of the co-ordinate system. The axis 16 marked on the chart therefore coincides with the line representing the normal hearing capacity or zero-line of hearing-loss.

At different frequencies the sensitiveness of a normal hearing person is not the same. Furthermore, the efficiency of the equipment used varies with regard to the different frequencies. In order to be able to use the same scale of hearing-loss at all frequencies, the dependences of frequency are compensated as follows:

The compensation is obtained partly by mechanical and partly by electrical means so that the dependence of frequency of human hearing sensitiveness is mainly compensated by mechanical means whereas the dependence of frequency of the equipment, particularly that of the receivers 4 and 5 is compensated by electrical means.

Mechanical compensation is obtained by such a method that the series of holes in pointer 11 indicating the hearing-loss will not form a straight line but a curve and so that the audiogram of a normal hearing person coincides with the axis 16 of the coordinate system. Taking this axis as base the degree of hearing-loss can be measured on the chart paper down to 120 decibels at frequencies of about 2048 cycles, and hearing sensitiveness above the normal value will be indicated above the axis 16.

The electrical compensation is effected by means of a flat potentiometer with contacts 22, 22 and 23, 23 on either side. The contacts 22 and 23 can be adjusted independently from one another. Knob 6 will switch in another contact of the groups 23 or 22 for each testing frequency thus changing the voltage taken from the resistance in the output circuit of the source of oscillation 1. The voltage is changed according to a curve 24 with regard to the contacts 23 for air conduction or according to a curve 25 with regard to the contacts 22 for bone conduction. The contacts 23 or 22 respectively pertain to the air conduction receiver 4 and to bone conduction receiver 5.

The potentiometer 21 can be used for gauging in that it is possible to compensate differences in properties when receivers have to be replaced. The potentiometer may also be used to compensate for other dependences of frequency of the apparatus and partly those concerning the sensitiveness of hearing. Also it can be used to correct inaccuracies of the mechanical compensating device.

The knob 7 provided for the changing of volume of the test tones takes measuring voltages from a system of resistances $$\left(R + R \cdot \frac{n-1}{n}\right)$$

and a shunt $R/n$ and leads them to the inlet of the measuring amplifier 3. These voltages have been chosen in accordance with logarithmic series.

In order to obtain the same audiograms on air conduction and bone conduction at the same hearing capacity, a change-over switch 17, 18 has to be operated when transferring from air to bone conduction. By doing so the volume of test tone will be increased to such an extent that the patient will perceive the same loudness at air conduction as at bone conduction. The switching device 17, 18 has a stopper 20 blocking the knob 7 of the volume control at a hearing-loss of about 80 decibels.

This switching device 17, 18 is mechanically connected with switches 19 and 26 for the receivers 4, 5 and the contacts 22 and 23 of the potentiometer 21. When the sound is transmitted by air, the dynamic receiver 4 is used, the switches 17, 18, 19 and 26 being in position "Air" (A). For bone conduction the receiver 5 is pressed against the mastoid bone behind the ear to be tested whereby the switches 17, 18, 19 and 26 are in position "Bone" (B). The receivers 4 and 5 always remain connected to the apparatus. Pointer 11 can be provided with a slot the same as pointer 10 so as to be able to change the frequency continuously and not by steps. The pointers can be arranged as diaphragms below a transparent table for the chart paper. These diaphragms together with a source of light produce a luminous spot on the chart at the crossing of the light paths of the diaphragms. At this spot a point has to be made with a pencil to indicate the measuring values of the audiogram. It is, moreover, possible to arrange the holes in the pointer 11 in such a manner that they also compensate the dependences of frequency of the apparatus and of the receivers without that electrical means would be necessary for compensating. It is advantageous in this case to have two different types of pointers, namely one for air conduction and one for bone conduction.

What I claim is:

In an apparatus for measuring hearing-loss by air conduction and bone conduction, the combination of: a source of an electrical oscillation for the generation of electrical current of variable frequency, an amplifier having a movable volume control, a receiver for bone conduction, a receiver for air conduction, a change over switching means for connecting the electrical source of variable frequency to the input of said amplifier and from the output of the amplifier to either of said receivers, said movable volume control having means for adjusting the electric current up to the maximum volume which can be delivered by said amplifier, an indicator, and a hearing-loss scale having a zero line, said scale operatively connected with the movable volume control, a control switch operatively associated with said movable volume control for increasing electric current when changing over from air conduction to bone conduction, means for limiting the movement of the volume control at different points of the hearing-loss scale, the limiting for the bone conduction being nearer to the zero line of the scale than that for air conduction, each of said different points corresponding to said maximum volume said control switching for increasing the volume when changing over from air conduction to bone conduction having a stopper arranged to be moved into the path of said movable volume control to limit its movement.

WALTER GRANDJOT.

References Cited in the file of this patent

UNITED STATES PATENTS

| Number | Name | Date |
| --- | --- | --- |
| 2,072,705 | Bloomheart | Mar. 2, 1937 |
| 2,087,838 | Clifford | July 20, 1937 |
| 2,257,263 | Koren | Sept. 30, 1941 |